United States Patent
Okugawa et al.

(10) Patent No.: US 7,266,944 B2
(45) Date of Patent: Sep. 11, 2007

(54) EXHAUST GAS FILTERING SYSTEM FOR INTERNAL COMBUSTION ENGINE

(75) Inventors: Shinichiro Okugawa, Toyota (JP); Kazuo Kojima, Nagoya (JP)

(73) Assignee: DENSO Corporation (JP)

( * ) Notice: Subject to any disclaimer, the term of this patent is extended or adjusted under 35 U.S.C. 154(b) by 0 days.

(21) Appl. No.: 11/296,222

(22) Filed: Dec. 8, 2005

(65) Prior Publication Data
US 2006/0117740 A1   Jun. 8, 2006

(30) Foreign Application Priority Data
Dec. 8, 2004  (JP)  ............... 2004-354883
Sep. 15, 2005  (JP)  ............... 2005-268162

(51) Int. Cl.
*F01N 3/00*  (2006.01)
(52) U.S. Cl. ............... 60/297; 60/278; 60/280; 60/285; 60/295
(58) Field of Classification Search .......... 60/278, 60/280, 286, 295, 297, 311, 285
See application file for complete search history.

(56) References Cited

U.S. PATENT DOCUMENTS

| | | | | |
|---|---|---|---|---|
| 6,742,331 B2 * | 6/2004 | Minami | .................... | 60/287 |
| 6,931,842 B2 * | 8/2005 | Ohtake et al. | ............... | 60/295 |
| 7,021,050 B2 * | 4/2006 | Nishimura et al. | ........... | 60/295 |
| 7,062,907 B2 * | 6/2006 | Kitahara | ..................... | 60/295 |
| 7,076,944 B2 * | 7/2006 | Okugawa et al. | ............. | 60/295 |
| 7,076,945 B2 * | 7/2006 | Sisken et al. | ................. | 60/295 |
| 2003/0230060 A1 | 12/2003 | Yahata et al. | | |

* cited by examiner

*Primary Examiner*—Binh Q. Tran
(74) *Attorney, Agent, or Firm*—Nixon Vanderhye PC (57) ABSTRACT

In order to restrict an over-temperature-rising of a diesel particulate filter (DPF), an electronic control unit (ECU) computes a flow rate of the exhaust gas flowing through the DPF so that temperature of the DPF is kept at a temperature in which the DPF can be regenerated. By adjusting a position of a throttle valve, a fresh air flow rate is adjusted so that the flow rate of the exhaust gas flowing through the DPF is equal to a target flow rate of the exhaust gas.

8 Claims, 9 Drawing Sheets

EXHAUST GAS FILTERING SYSTEM FOR INTERNAL COMBUSTION ENGINE

CROSS REFERENCE TO RELATED APPLICATIONS

This application is based on Japanese Patent Applications No. 2004-354883 filed on Dec. 8, 2004 and No. 2005-268162 filed on Sep. 15, 2005, the disclosure of which are incorporated herein by reference.

FIELD OF THE INVENTION

The present invention relates to an exhaust gas filtering system having a particulate filter in an exhaust pipe, which restricts an over-temperature-rising of the particulate filter during a regeneration of the particulate filter.

BACKGROUND OF THE INVENTION

An exhaust gas filtering system having a diesel particulate filter (which is referred to as DPF) disposed in an exhaust pipe of a diesel engine is well known. The DPF captures particulates (which is referred to as PM) contained in exhaust gas from the diesel engine. The DPF is periodically regenerated by combusting the accumulated PM according to accumulated PM quantity which is estimated from a differential pressure between upstream and downstream of the DPF.

Figure 2A:
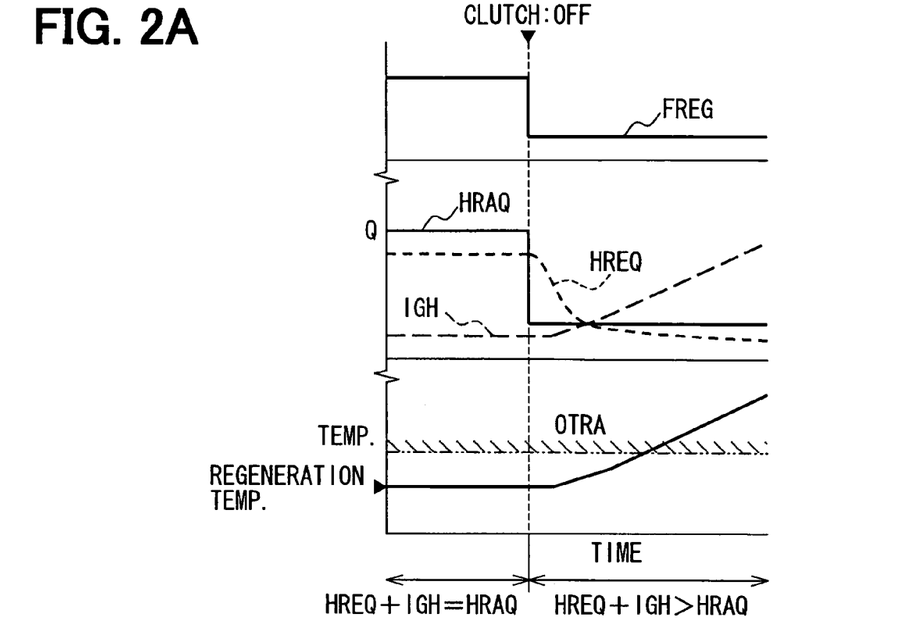
FIG. 2A is a time chart for explaining a variation of regenerating temperature of the DPF.

JP-2004-068804A (US-2003/0230060A1) shows a problem of the exhaust gas filtering system that temperature of the DPF is over-rising. A steep combustion of the accumulated DPF causes a steep temperature rising of the DPF, so that it may cause damages of the DPF and a deterioration of catalyst supported by the DPF. This over-temperature-rising of the DPF is tend to arise especially when temperature of the exhaust gas flowing into the DPF is relatively high due to high-load driving of the engine, or when the flow rate of the exhaust gas passing through the DPF is steeply decreased in a situation that the temperature of the DPF is high by a regenerating operation thereof. As shown in FIG. 2A, it is because that heat radiation quantity HRAQ radiating from DPF into the exhaust gas is steeply decreased to steeply increase the temperature of the DPF.

In order to restrict the temperature rising, even if an operation is conducted to reduce the heat quantity HREQ transferring into the DPF from the exhaust gas, for example, the exhaust gas temperature is decreased or unburned HC is stopped to be supplied to the DPF, it is hard to restrict the temperature rising of whole of the DPF because the downstream portion of the DPF receives heat from the upstream portion of the DPF via the exhaust gas flowing therethrough. It is necessary to increase the exhaust gas quantity flowing through the DPF so that the HRAQ into the exhaust gas is increased to restrict the temperature rising of the downstream portion of the DPF. JP-2004-068804A shows the system in which the exhaust gas quantity flowing into the DPF is increased when the over-temperature-rising may occur.

However, when the exhaust gas flow rate is increased too much during regeneration thereof, the temperature of the upstream portion of the DPF is considerably reduced. Thus, fuel is wasted to increase the temperature of the DPF again, so that fuel economy is deteriorated.

SUMMARY OF THE INVENTION

The present invention is made in view of the above matters, and it is an object of the present invention to provide an exhaust gas filtering system in which a flow rate of an exhaust gas flowing through the DPF is well controlled in such a manner that over-temperature-rising of a downstream portion of the DPF is restricted and a deterioration of a fuel economy due to a temperature reduction of an upstream portion of the DPF is restricted.

According to the present invention, an exhaust gas filtering system for an internal combustion engine has a particulate filter capturing particulates contained in exhaust gas, and a temperature-rising control means for increasing temperature of the particulate filter and keeping the temperature of the particulate filter at a predetermined temperature. The temperature-rising control means includes a target gas condition computing means for computing a target condition of the exhaust gas flowing through the particulate filter, the target condition in which heat is transferred between the particulate filter and the exhaust gas so that the temperature of the particulate filter is maintained at the predetermined temperature. The temperature-rising control means includes a gas flow rate control means for adjusting flow rate of the exhaust gas flowing through the particulate filter in such a manner as to obtain the target condition. Thus, the exhaust gas increment in quantity is restricted, an over-temperature-rising of the particulate filter is restricted, and a deterioration of fuel economy is also restricted.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF THE PREFERRED EMBODIMENTS

Embodiments of the present invention will be described hereinafter with reference to the drawings.

First Embodiment

Figure 1:
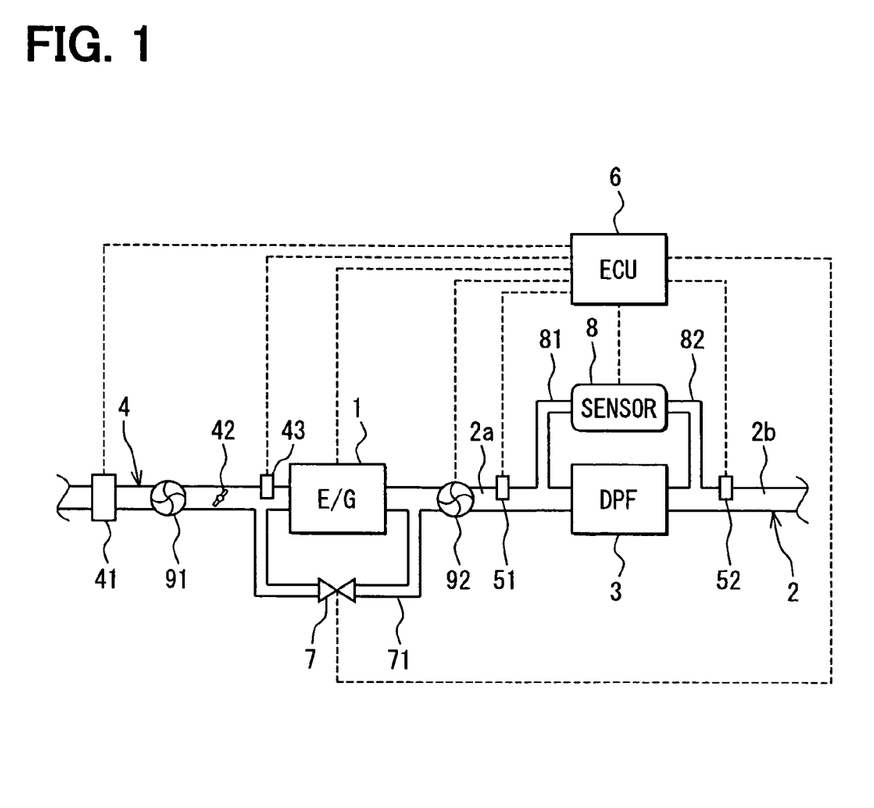
FIG. 1 is a schematic view of an exhaust gas filtering system.

An exhaust gas filtering system for a diesel engine is described herein after. FIG. 1 is a schematic view showing the exhaust gas filtering system for the diesel engine. An exhaust pipe 2 includes a first exhaust pipe 2a and a second exhaust pipe 2b. A diesel particulate filter (DPF) 3 is arranged between the first exhaust pipe 2a and the second exhaust pipe 2b. The DPF 3 has a well-known structure in which refractory ceramics, such as cordierite, is molded into a honeycomb structure that has a plurality of cells forming exhaust gas passage. Ends of the cells are alternatively closed such that each cell only has one of an inlet opening and an outlet opening at its open end. The exhaust gas of the engine 1 is introduced into the DPF 3 such that the exhaust gas enters the inlet opening of one cell and is supplied to the next cell through the corresponding porous wall and is discharged through the outlet opening of the next cell. Particulates (PM) contained in the exhaust gas are filtered and collected by the DPF 3 when the exhaust gas passes through the porous wall of each corresponding cell.

The DPF 3 supports an oxidation catalyst thereon by which hydro-carbon (HC) flowing through the exhaust pipe 2 is combusted to efficiently increase temperature of exhaust gas and the DPF 3. Alternatively, the DPF 3 may have no oxidation catalyst thereon, or the oxidation catalyst may be arranged upstream of the DPF 3.

A first exhaust-gas-temperature sensor 51 and a second exhaust-gas-temperature sensor 52 are respectively provided in the first exhaust pipe 2a and the second exhaust pipe 2b. The first and second exhaust-gas-temperature sensors 51, 52 detect upstream temperature and downstream temperature of the DPF 3, and are electrically connected with an ECU (electronic control unit) 6 to send the detected signals into the ECU 6. An air flow meter (intake air sensor) 41 is provided in an intake pipe 4 to send a signal indicative of intake air flow rate to the ECU 6. A throttle valve 42 is provided downstream of the air flow meter 41 to increase/decrease the intake air flow rate receiving commands from the ECU 6. An intake air pressure sensor 43 is provided in the intake pipe 4 to detect intake air pressure downstream of the throttle valve 42.

The intake pipe 4 is communicated with the first exhaust pipe 2a through an EGR pipe 71 provided with an EGR valve 7. The EGR valve 7 adjusts quantity of exhaust gas which is recirculated to the intake pipe 4 from the first exhaust pipe 2a, receiving command signals from the ECU 6. A compressor 91 of a turbocharger is provided between the air flow meter 41 and the throttle valve 42. The compressor 91 is mechanically connected with a turbine 92 provided in the first exhaust pipe 2a through a shaft (not shown). The turbocharger has well-known structure. The exhaust gas drives the turbine 92 to rotate the compressor 42. The compressor 42 compresses the intake air which is supplied to the engine 1. The turbine 9 has a variable nozzle (not shown) which controls a position of a nozzle vane (VNT: not shown) to adjust the supercharging pressure according to the driving condition of the engine 1.

A differential pressure sensor 8 is connected to the first and second exhaust pipes 2a, 2b in order to detect quantity of accumulated particulates (which is referred to as QAPM) captured by the DPF 3. The quantity of accumulated particulates captured by the DPF 3 is referred to as QAPM hereinafter. One end of the differential pressure senor 8 is connected to the first exhaust pipe 2a through a first pressure introducing pipe 81, and the other end of the sensor 8 is connected to the second exhaust pipe 2b through a second pressure introducing pipe 82. The differential pressure sensor 8 sends signal indicative of differential pressure between upstream and downstream of the DPF 3 to the ECU 6. This differential pressure is referred to as DPF differential pressure hereinafter.

The ECU 6 is connected with sensors (not shown), such as an accelerator position senor and an engine speed sensor, to detect the driving condition of the engine 1. The ECU 6 controls appropriate fuel injection quantity, fuel injection timing, and fuel injection pressure to conduct an appropriate fuel injection according to the driving condition of the engine 1. The ECU 6 controls a regenerating control of the DPF 3. When the QAPM exceeds a predetermined value, the DPF 3 is heated by a heating means (not shown) to combust the accumulated PM. The process of regeneration of the DPF 3 will be described hereinafter.

The QAPM is estimated based on the DPF differential pressure detected by the differential pressure senor 8. In the situation that the quantity of the exhaust gas is constant, the DPF differential pressure is increased according as the QAPM is increased. Based on this relationship between the DPF differential pressure and the exhaust gas quantity, the QAPM can be estimated. Alternatively, discharged quantity of the PM is calculated based on the driving condition of the engine, and then the discharged quantity is integrated to estimate the QAPM. These estimating method can be combined.

The heating means is specifically, such as a post fuel injection, a retard of fuel injection timing, an intake throttle by the throttle valve 42, an increment of EGR amount by the EGR valve 7, and an intercooler bypass. This heating means causes heat generation by oxidation reaction of unburned HC supplied to the exhaust pipe 2. The temperature of the exhaust gas from the engine 1 is increased. Thereby, exhaust gas in high temperature is supplied to the DPF 3.

The ECU 6 controls the heating means to maintain the DPF3 in a predetermined regenerating temperature to regenerate the DPF 3 by operating the heating means. This corresponds to a temperature rising control means. The predetermined regenerating temperature (target temperature for regeneration) may be constant, for example, 650° C., or may be stepwise varied according to the QAPM. In the situation that the target temperature is varied, the target temperature is set to be lower than a preset value to keep safety during an early period in which the QAPM is relatively large, and then the target temperature is increased when the QAPM is reduced, whereby an efficient regeneration can be conducted.

The temperature rising control mean controls the temperature rising operation amount and controls the flow rate of the exhaust gas flowing through the DPF 3 to keep the DPF 3 at the target regenerating temperature. That is, a target gas flow rate computing means computes a target exhaust gas flow rate so that the DPF 3 is kept at the target regenerating temperature. An exhaust gas flow rate control means controls the flow rate of the exhaust gas flowing through the DPF 3 so that the flow rate of the exhaust gas is consistent with the target regenerating temperature.

In a conventional control method shown in FIG. 2A, when the driving condition of the engine is varied (for example, deceleration) during regeneration of the DPF 3, the flow rate of the exhaust gas (FREG) is steeply increased to steeply raise the temperature of the DPF 3 up to over-temperature-rising area (OTRA). This is because the condition in which the regenerating temperature is constant (the HREQ+internal generated heat of DPF=the HRAQ) is changed into the other condition in which the heat quantity transferred into the exhaust gas flowing through the DPF 3 is steeply decreased. Thus, the total of the HREQ and the internal generated heat of DPF exceed the HRAQ, so that the temperature of the DPF 3 is increased. The internal generated heat of DPF is referred to as IGH hereinafter.

Figure 2B:
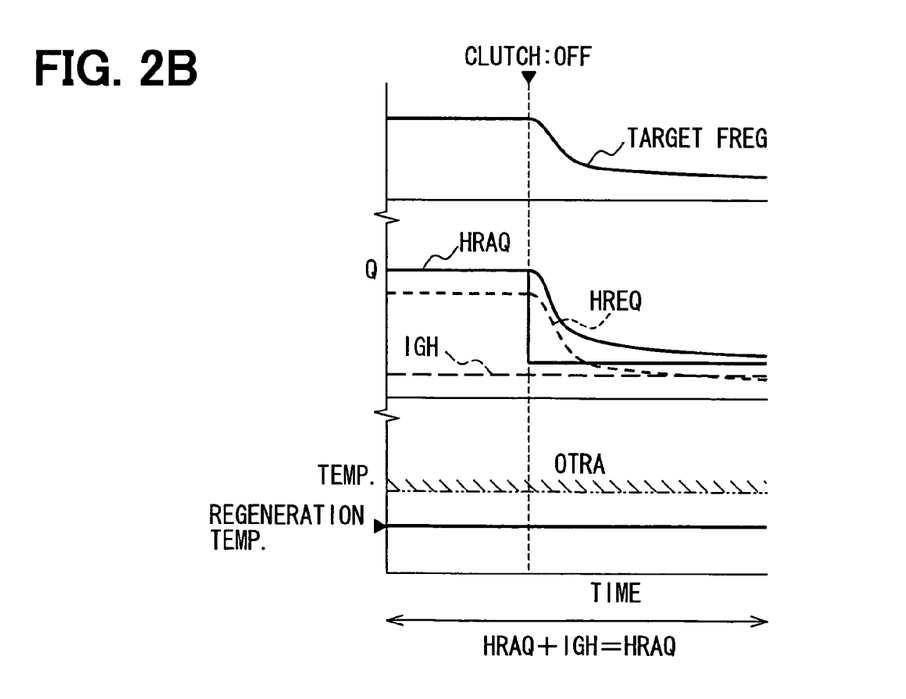
FIG. 2B is a time chart for explaining a variation of regenerating temperature of the DPF according to the present invention.

In order to avoid such a situation, the flow rate of the exhaust gas flowing through the DPF 3 should be defined to establish a following equation as shown in FIG. 2B even if the driving condition of the engine is varied.

$$HREQ+IGH=HRAQ$$

That is, the heat quantity transferred to the exhaust gas from the DPF 3 is controlled such that the predetermined regenerating temperature is maintained.

Figure 3:
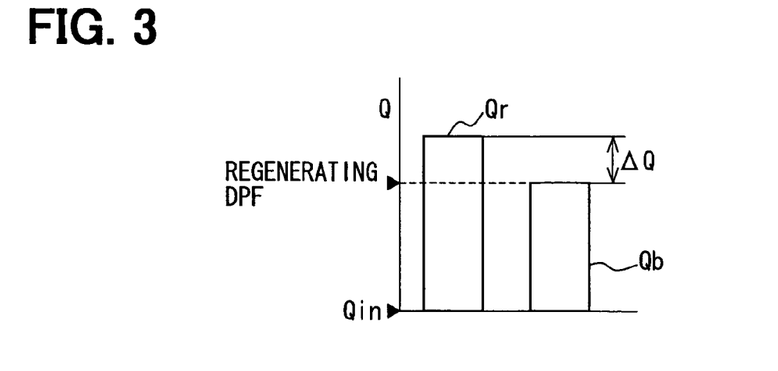
FIG. 3 is a graph for explaining a computing method of an excess and deficiency heat quantity in order to keep the temperature of the DPF.

The target gas flow rate computing means computes excess and deficiency of heat quantity to maintain the temperature of the DPF 3, and computes the target gas flow rate which corresponds to the excess and the deficiency of heat quantity. Specifically, as shown in FIG. 3, the excess and the deficiency of heat quantity $\Delta Q$ is computed based on the following equation.

$$\Delta Q=Qr-Qb$$

Qr represents a total heat quantity generated in the DPF 3 due to HC combustion and PM combustion. Qb represents a heat quantity necessary to increase the temperature of the DPF from the exhaust gas temperature to the target regenerating temperature (for example, 650° C.). The heat radiation quantity (HRAQ) Qout is computed following equation.

$$Qout=Qex-Qin$$

Qin represents heat quantity that the exhaust gas flowing out from the DPF 3 has. Qex represent heat quantity that the exhaust gas flowing into the DPF 3 has. Here, in the case that Tin represents temperature of exhaust gas flowing into the DPF 3, Tex represents temperature of exhaust gas flowing out from the DPF 3, Mgas represents flow rate of the exhaust gas, and Cp represents specific heat of the exhaust gas, following equations are established.

$$Qex=Cp \times Mgas \times Tex$$

$$Qin=Cp \times Mgas \times Tin$$

Thus, flow rate of the exhaust gas Mtrg in which Qout is equal to $\Delta Q$ is expressed by following equation.

$$Mtrg=\Delta Q/\{Cp \times (Tex-Tin)\}$$

Mtrg is defined as a target flow rate of the exhaust gas.

The flow rate of the exhaust gas is controlled is such a manner as to become the target flow rate, so that the transferring heat quantity is consistent with the excess and deficiency heat quantity. Thus, a surplus heat quantity which raise the temperature of the DPF 3 higher than the target regenerating temperature can be radiated into the exhaust gas flowing through the DPF 3 to maintain the temperature of the DPF 3 at the target regenerating temperature. The target flow rate of the exhaust gas can be replaced by a target temperature of the exhaust gas.

Figure 4:
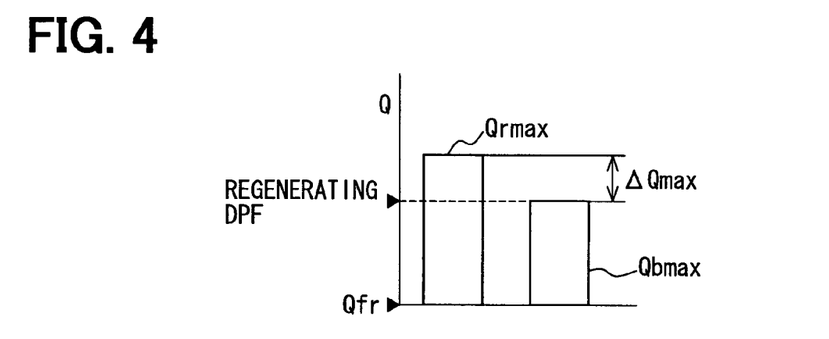
FIG. 4 is a graph for explaining a computing method of an excess and deficiency heat quantity in order to keep the maximum temperature of the DPF.
Figure 5:
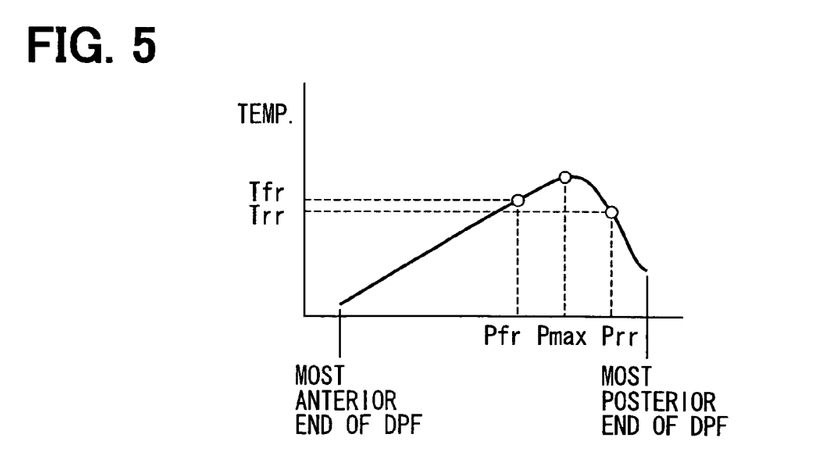
FIG. 5 is a graph showing an internal temperature distribution of the DPF.

Alternatively, as shown in FIGS. 4 and 5, the target gas flow rate can be derived from an internal temperature distribution of the DPF 3 in order to maintain the maximum temperature of the DPF 3. In this method, the DPF 3 is treated by means of concentrated constant system, so that the target flow rate of the exhaust gas can be accurately computed relative to the method shown in FIG. 3. The excess and deficiency heat quantity $\Delta Q max$ at the maximum temperature position Pmax is computed based on a total heat quantity Qrmax including a generating heat quantity due to the HC combustion and the PM combustion at the position Pmax and the transferred heat quantity, heat quantity Qfr of the exhaust gas flowing into the position Pmax, and heat quantity Qbmax for maintaining the temperature at the position Pmax as the target regenerating temperature. And then, the flow rate of the exhaust gas is computed based on the excess and deficiency heat quantity $\Delta Q max$ and gas temperature Tfr, Trr at upstream position Pfr and downstream position Prr relative to the position Pmax so that the temperature at the position Pmax is maintained.

Thus, the flow rate of the exhaust gas flowing through the DPF 3 is consistent with the target flow rate of the exhaust gas, so that the maximum temperature of the DPF 3 is maintained at the target regenerating temperature to restrict over-temperature-rising of the DPF 3. Alternatively, when the driving condition is varied from high-load to low-load or from high-speed to low-speed, the target flow rate of the exhaust gas for maintaining the temperature of the DPF at the desirable temperature is computed.

The gas flow rate control means, specifically, adjusts the quantity of the exhaust gas from the engine 1 in such a manner that the flow rate of the exhaust gas flowing through the DPF 3 is consistent with the target flow rate of the exhaust gas. For example, because the flow rate of the exhaust gas=the flow rate of the exhaust gas flowing through the DPF 3+EGR quantity=the fresh air flow rate+the EGR quantity, the flow rate of the exhaust gas flowing through the DPF 3 is equal to the fresh air flow rate. According to a deviation between the fresh air flow rate and the target gas flow rate, the pressure loss is varied by operating the throttle valve 42, the EGR quantity is varied by operating the EGR valve 71, or the exhaust gas pressure loss and supercharging pressure are varied by operating the nozzle vane of the turbine 92 to adjust driving power of the turbine, so that the intake air pressure is adjusted to maintain the fresh air flow rate around the target gas flow rate. Besides. In the case that the turbine is provided with an electric motor, the intake air pressure can be adjusted by controlling the speed of the electric motor. When the exhaust gas energy is relatively low, the electric motor is effective to adjust the exhaust gas quantity.

When the fresh air flow rate is excessively decreased, the intake air pressure is also excessively decreased to introduce engine oil into the cylinder, which causes some problems. To avoid such problems, an open degree of the throttle valve 42, an open degree of the EGR valve 71, and the open degree of the nozzle vane are restricted according to the intake air pressure.

Figure 6:
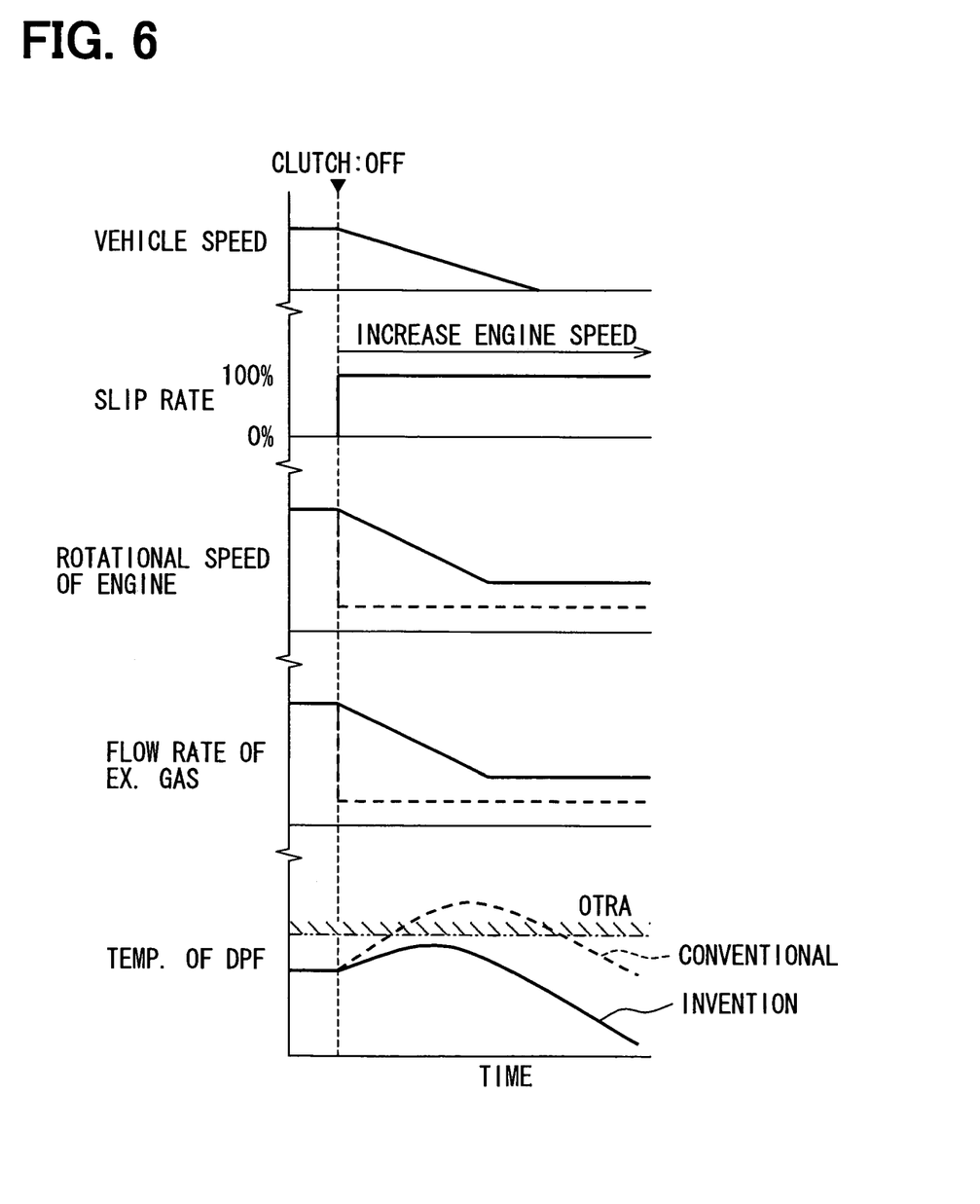
FIG. 6 is a time chart for explaining a control method in which the flow rate of the exhaust gas is increased according to a slip rate and a vehicle speed.

The increase in quantity of the exhaust gas flowing through the DPF 3 depends on a rotational speed of the engine 1. When the rotational speed of the engine is in low area, such as idle, the flow rate of the exhaust gas may be hardly increased to the target flow rate, so that the over-temperature-rising may arise. To avoid such a problem, the rotational speed of the engine 1 is increased according to slip rates of the engine output shaft and the vehicle to obtain a necessary flow rate of the exhaust gas. As shown in FIG. 6, when the slip rate is approximately 100%, for example, when a clutch (not shown) is disengaged, the rotational speed of the engine 1 is increased up to a speed in which the target flow rate is obtained, whereby the over-temperature-rising is restricted. When the rotational speed of the engine is excessively increased relative to the vehicle speed, it may cause some problems. Thus, an upper limit of increment in rotational speed should be established.

Referring to FIGS. 7 to 12, an operation flow of the ECU 6 is described hereinafter.

Figure 7:
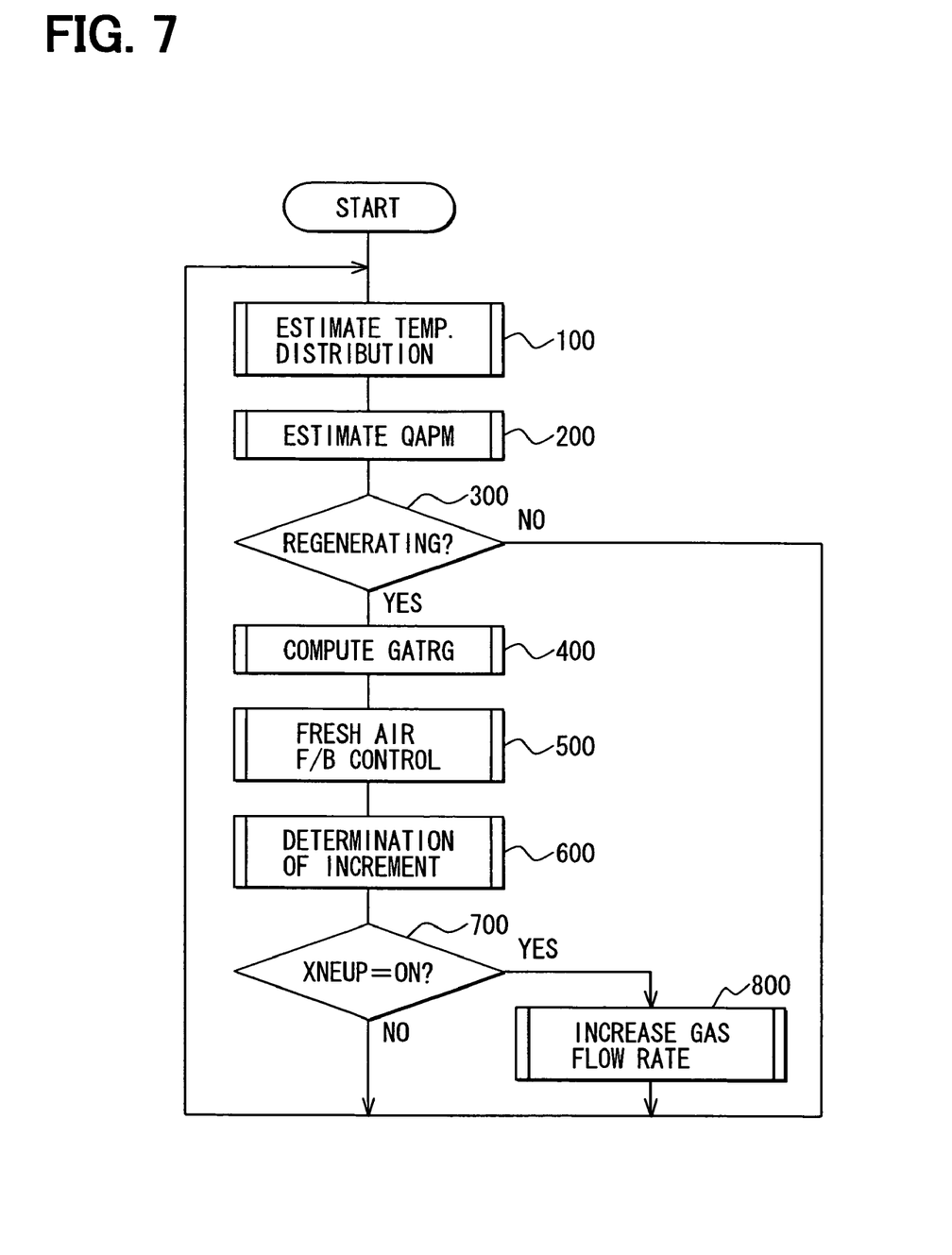
FIG. 7 is a flow chart showing a control method in which the flow rate flowing through the DPF is adjusted.
Figure 8A:
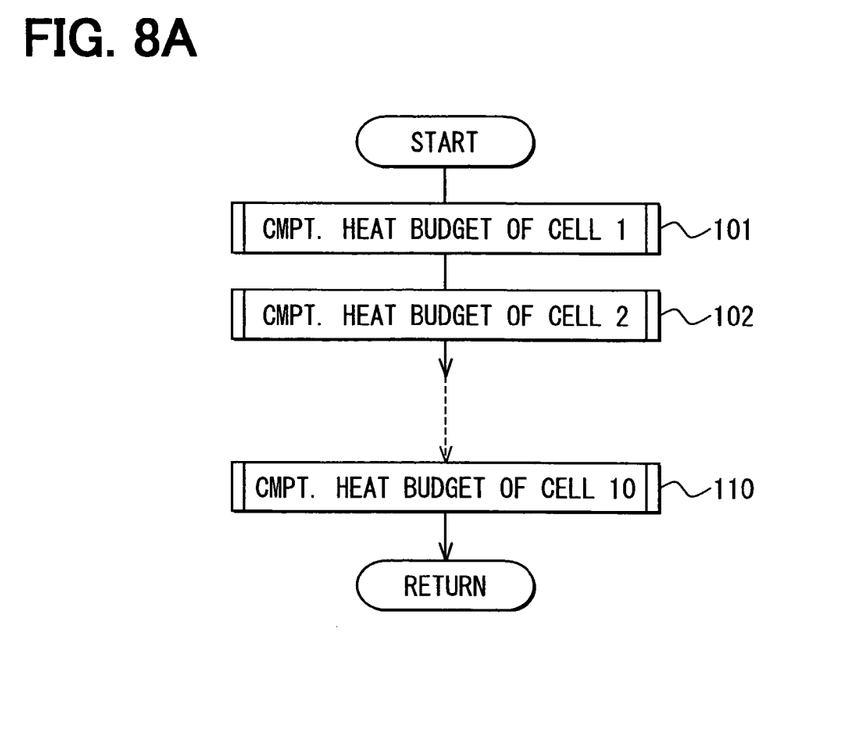
FIG. 8A is a flow chart for explaining a method in which the temperature distribution of the DPF is estimated.

FIG. 7 is a flow chart showing a main operation of heating control of the DPF 3. In step 100, a temperature distribution of interior of DPF 3 is estimated. In this embodiment, ten temperature-estimating points are established on the DPF 3 along a gas flow line, and the DPF 3 is virtually divided into ten cells of which temperature is measured to derive the temperature distribution. FIG. 8A is a flow chart showing a process to estimate the temperature distribution. In steps 101 to 110, heat budget of each cell is computed. The heat budget of each cell is computed by means of a heat budget model shown in FIG. 8B.

Figure 8B:
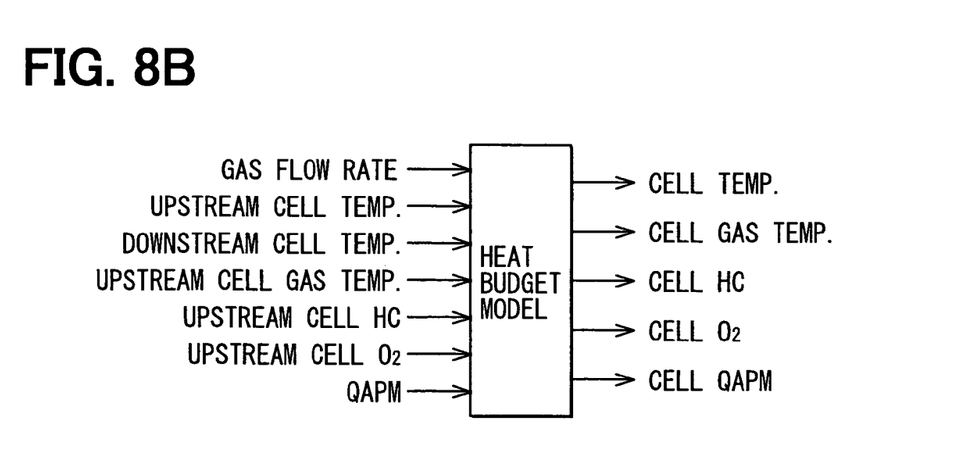
FIG. 8B is a chart showing a cell heat budget computing model.

Heat conduction quantity of each cell is computed based on a heat transfer quantity of the DPF-substrate and the exhaust gas, the HC generating heat quantity, the PM generating heat quantity, and temperature of the cell substrate in order to compute heat quantity that the cell receives. The increment in temperature is computed based on the received heat quantity and heat capacity of the cell in order to compute temperature of the cell substrate. At the same time, increment in HC quantity, increment in PM quantity, and $O_2$ consumption are computed. This heat budget computation is conducted with respect to from first cell to tenth cell to compute cell substrate temperature T1 to T10. The temperature T1 corresponds to temperature of the most upstream portion of the DPF 3, and the temperature T10 corresponds to temperature of the most downstream portion of the DPF 3. The flow rate of the exhaust gas is detected based on a detected value of the air flow meter 41, upstream gas temperature of the first cell is detected based on a detected value of the first exhaust-gas-temperature sensor 51, and the upstream HC quantity of the first cell is detected based on the driving condition.

In step 200 of FIG. 7, the QAPM is estimated based on the DPF differential pressure and the flow rate of the exhaust gas. The DPF differential pressure is computed by means of the differential pressure sensor 8, and the flow rate of the exhaust gas is computed based on the detected value of the air flow meter 41. In step 300, a determination is made as to whether the DPF 3 is regenerated based on a DPF temperature rising control routine (not shown). In the DPF temperature rising control routine, a comparison is made between the QAPM and a predetermined regeneration-staring QAPM. When the QAPM exceeds the regeneration-staring QAPM, a regeneration flag is turned on to start heating operation. When the flag is on and the answer is Yes in step 300, the procedure proceeds to step 400 in which the gas flow rate control is conducted based on following steps. When the answer is No in step 300, the procedure ends.

Figure 9:
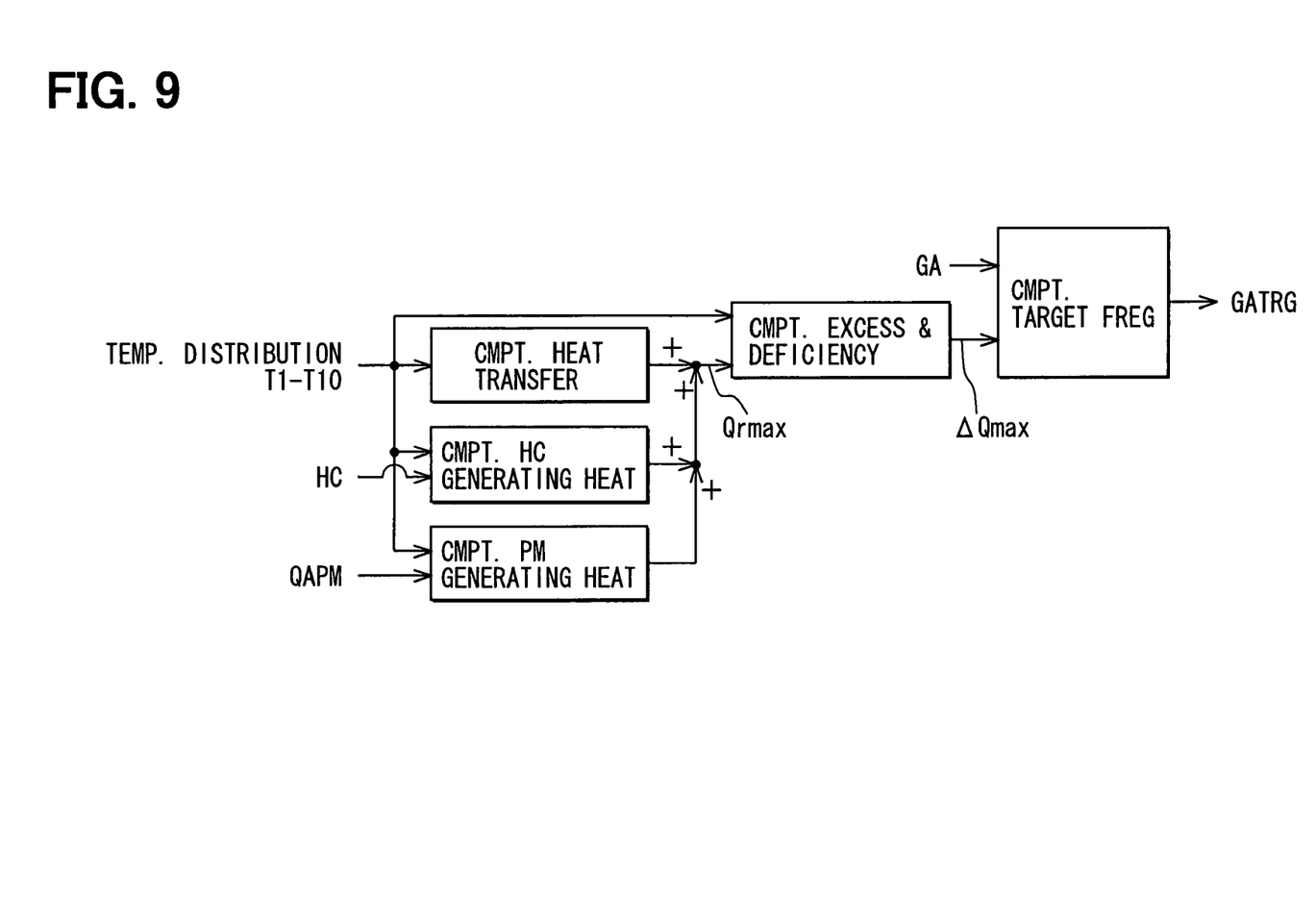
FIG. 9 is a block chart for computing target air flow rate of the exhaust gas.

In step 400, target air flow rate of the exhaust gas during regeneration of DPF, which is referred to as GATRG, is computed based on the DPF temperature distribution. This GATRG is the flow rate to maintain the maximum temperature of the DPF 3 at the regeneration temperature thereof. FIG. 9 is a block diagram of a routine for computing the target rate of exhaust gas during regeneration. In this routine, generating heat quantity and heat conduction quantity due to the HC combustion and the PM combustion at the position Pmax are computed based on the cell substrate temperature computed in step 100, the HC quantity flowing into the DPF 3, the QAPM computed in step 200. These heat quantity are added together to compute the total heat quantity Qrmax.

Then, the excess and deficiency heat quantity ΔQmax is computed based on the following equation (1)

$$\Delta Qmax = Qrmax - Qbmax \qquad (1)$$

The heat radiation quantity (HRAQ) Qout is computed based on the following equation (2)

$$Qout = Qrr - Qfr \qquad (2)$$

Qrr represents heat quantity that the exhaust gas at a position Prr which is downstream of the position Pmax has. Qfr represents heat quantity that the exhaust gas at a position Pfr which is upstream of the position Pmax.

In the case that the temperature of the exhaust gas at the position Pfr is represented by Tfr, the temperature of the exhaust gas at the position Prr is represented by Trr, the flow rate of the exhaust gas is represented by Mgas, and the exhaust gas specific heat is represented by Cp, following equations (3), (4) are established.

$$Qrr = Cp \times Mgas \times Trr \qquad (3)$$

$$Qfr = Cp \times Mgas \times Tfr \qquad (4)$$

When the Qout is equal to the ΔQmax, the flow rate of the exhaust gas Mtrg is represented by the following equation (5).

$$Mtrg = \Delta Qmax / \{Cp \times (Trr - Tfr)\} \qquad (5)$$

The flow rate of the exhaust gas Mtrg is converted into a flow rate per a unit of time to obtain the target air flow rate of the exhaust gas during regeneration GATRG.

In step 500, the fresh air flow rate is feed backed to vary the open degree of the throttle valve 42 in order to maintain the fresh air flow rate around the target air flow rate GATRG computed in step 400. The intake air flow rate (fresh air+EGR gas) is equal to the flow rate of the exhaust gas (EGR gas+exhaust gas passed through the DPF). Because the flow rate of EGR gas is constant, the flow rate of the exhaust gas flowing through the DPF can be adjusted by operating the throttle valve to increase/decrease the fresh air flow rate.

Figure 10:
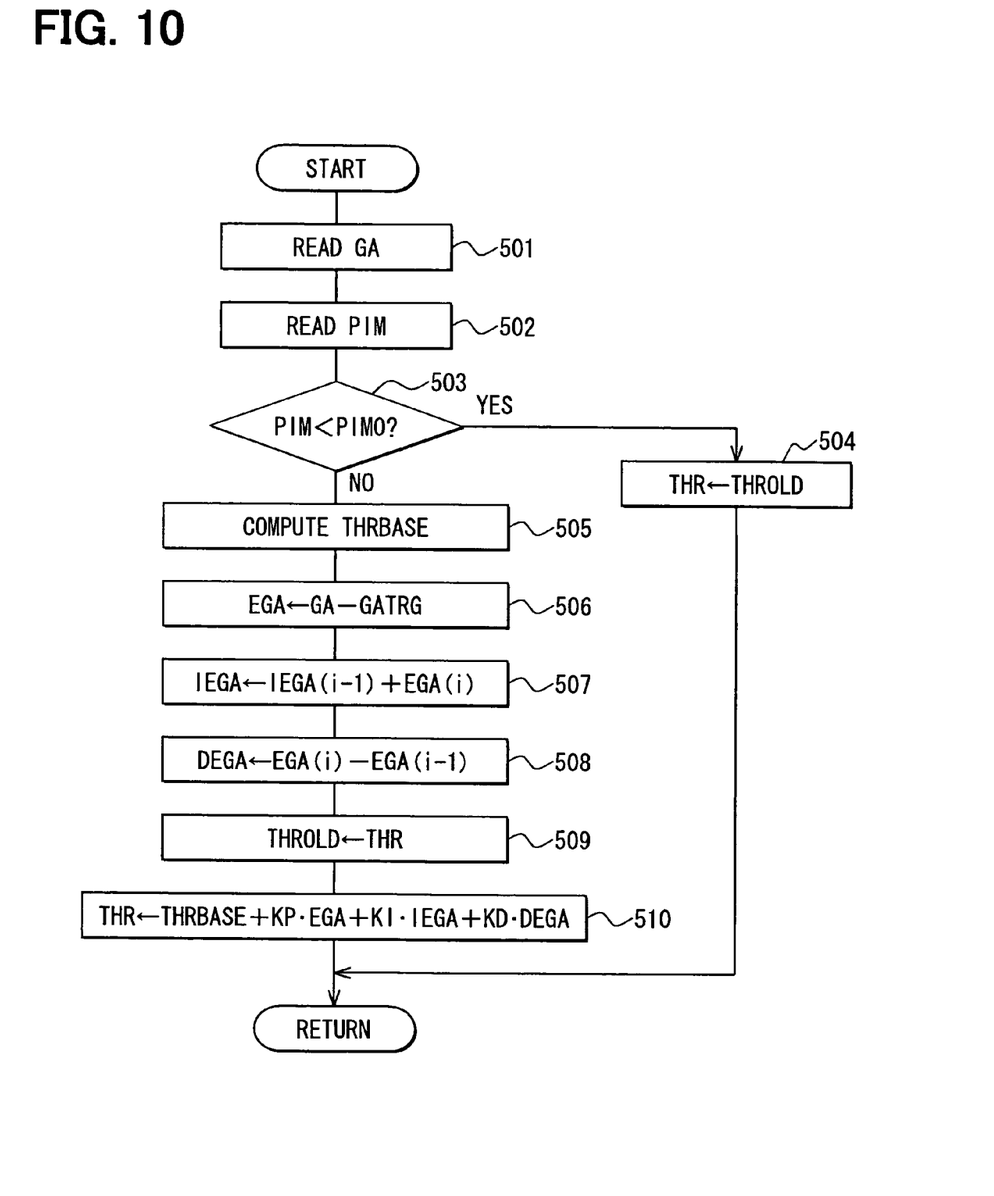
FIG. 10 is a flow chart showing a feedback control of an air flow rate pf fresh air.

FIG. 10 is a flowchart showing a fresh air feedback control process. In step 501, the fresh air flow rate GA is read from the air flow meter 41. In step 502, the intake air pressure PIM is read from the intake air pressure sensor 43. In step 503, a determination is made as to whether the intake air pressure PIM is lower than a predetermined pressure PIM0. When the answer is Yes in step 503, the procedure proceeds to step 504 in which the throttle position THR is kept as the previous value THROLD to end the procedure.

In step 505, a base throttle position THRBASE is computed by means of a map based on the rotational speed of the engine and the required torque. The base throttle position THRBASE is corrected by PID control to compute the throttle position THR.

In step 506, a deviation EGA between the fresh air flow rate GA read in step 501 and the target air flow rate GATRG computed in step 400.

$$EGA \leftarrow GA - GATRG \qquad (6)$$

In step 507, an integral amount IEGA of the deviation EGA is computed based on the previous integral amount. In step 508, a differential amount DEGA is computed based on the previous differential amount.

$$IEGA(i) \leftarrow IEGA(i-1)+EGA(i) \quad (7)$$

$$DEGA(i) \leftarrow EGA(i)-EGA(i-1) \quad (8)$$

In step 509, the previous throttle position THROLD is replaced by the current throttle position THR. In step 510, the throttle position THR is computed based on a proportional gain KP, an integral gain KI, and a differential gain KD.

$$THR \leftarrow THRBASE+KP \cdot EGA+KI \cdot IEGA+KD \cdot DEGA \quad (9)$$

In step 600 of FIG. 7, a determination is made as to whether it is necessary to increase the flow rate of the exhaust gas by increasing the rotational speed of the engine 1. Specifically, in step 601 of FIG. 11, a determination is made as to whether the clutch is disengaged. When the clutch is disengaged, the procedure proceeds to step 602 in which a determination is made as to whether the throttle position THR computed in step 510 is a full-open position THRMAX. When the answer is Yes in step 602, the procedure proceeds to step 603. When the clutch is not disengaged in step 601, and when the throttle position THR is not the full-open position THRMAX, the procedure proceeds to step 606.

Figure 11:
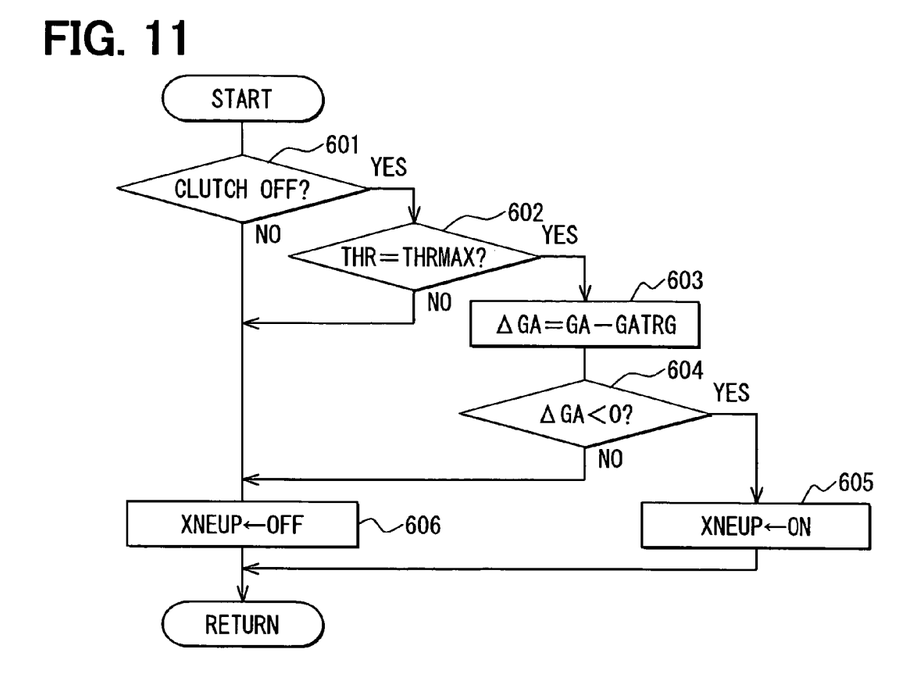
FIG. 11 is a flow chart showing a gas increment determination method.

In step 603, a deviation ΔGA between GA and GATRG is computed. In step 604, a determination is made as to whether the deviation ΔGA is less than zero, which means the flow rate of the exhaust gas is shortage. When the answer is Yes in step 604, the procedure proceeds to step 605 in which an engine speed increasing flag XNEUP is turned on. When the answer is No in step 604, the procedure proceeds to step 606 in which the flag XNEUP is turned off.

Figure 12:
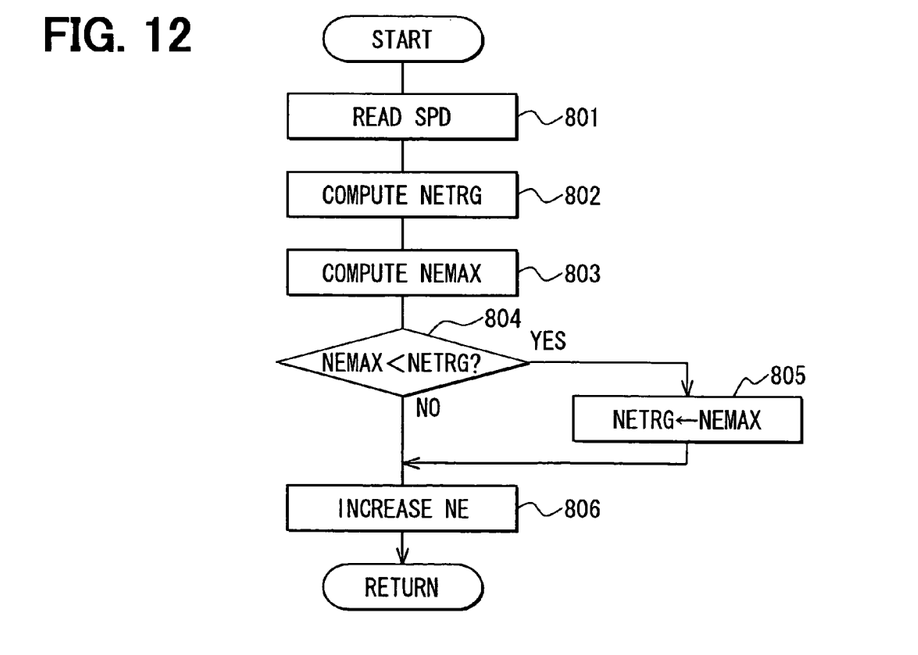
FIG. 12 is a flow chart showing a gas flow rate increment method.

In step 700 of FIG. 7, a determination is made as to whether the flag XNEUP is on. When the flag XNEUP is off, the procedure ends. When the flag XNEUP is on, the procedure proceeds to step 800 in which the rotational speed of the engine is increased to increase the flow rate of the exhaust gas. In step 801 of FIG. 12, the vehicle speed SPD is read. In step 802, a target rotational speed of engine NETRG is computed. The target rotational speed NETRG is computed based on the following equation (10).

$$NETRG=GATRG/(\eta \times V) \quad (10)$$

wherein V represents an engine displacement.

In step 803, an acceptable maximum engine speed NEMAX is computed. The acceptable maximum engine speed NEMAX is the engine speed in which the vehicle is not accelerated even when the clutch is engaged. Specifically, the rotational speed of engine, which maintains the current vehicle speed at the minimum gear ratio, is computed. In step 804, a determination is made as to whether NETRG is greater than NEMAX. When the answer is Yes in step 804, the procedure proceeds to step 805 in which the rotational speed of the engine is restricted in such a manner that the NEMAX is equal to the NETRG. Then, the procedure proceeds to step 806. When the answer is No in step 804, the procedure proceeds to step 806. In step 806, the fuel injection quantity is adjusted so that the rotational speed of the engine is equal to the target rotational speed NETRG.

As described above, the flow rate of the exhaust gas flowing through the DPF can be adjusted to the target air flow rate of the exhaust gas during regeneration GATRG. Thus, the heat quantity corresponding to the excess and deficiency heat quantity ΔQ can be radiated outside of the DPF 3 as the heat radiation quantity (HRAQ) Qout, so that over-temperature-rising of the DPF 3 is restricted to avoid the deterioration of the fuel economy.

What is claimed is:

1. An exhaust gas filtering system for an internal combustion engine having a particulate filter capturing particulates contained in exhaust gas, comprising:

a temperature-rising control means for increasing temperature of the particulate filter and keeping the temperature of the particulate filter at a predetermined temperature, wherein the temperature-rising control means includes:

a target gas condition computing means for computing excess and deficiency of heat quantity, based on total heat quantity generated in the particulate filter and temperature of the particulate filter, which is sufficient for maintaining the particulate filter at the predetermined temperature, and computing the target gas condition so that the excess and deficiency of heat quantity is equal to heat which is transferred between the exhaust gas and the particulate filter; and a gas flow rate control means for adjusting flow rate of the exhaust gas flowing through the particulate filter in such a manner as to obtain the target condition.

2. The exhaust gas filtering system according to claim 1, wherein the target gas condition computing means computes the target gas condition based on a temperature distribution of the particulate filter in order to keep a maximum temperature of the particulate filter.

3. The exhaust gas filtering system according to claim 1, wherein the target gas condition corresponds to either a target flow rate of the exhaust gas or a target temperature of the exhaust gas.

4. The exhaust gas filtering system according to claim 3, wherein the target gas condition corresponds to a target flow rate of the exhaust gas, and the gas flow rate control means increasingly corrects the flow rate of the exhaust gas flowing through the particulate filter relative to the target flow rate of the exhaust gas when at least one of rotational speed of the engine and driving load of the engine is decreased.

5. The exhaust gas filtering system according to claim 3, wherein the target gas condition corresponds to a target flow rate of the exhaust gas, and the gas flow rate control means adjusts exhaust gas quantity from the engine in such a manner that the flow rate of the exhaust gas flowing through the particulate filter is equal to the target flow rate of the exhaust gas.

6. The exhaust gas filtering system according to claim 5, wherein the gas flow rate control means feedback controls an intake air flow rate by adjusting at least one of a throttle position of a throttle valve, an open degree of an EGR control valve, and rotational turbine power of a supercharger.

7. The exhaust gas filtering system according to claim 6, wherein
the gas flow rate control means establishes a guard in order to keep an intake air pressure higher than a predetermined value.

8. The exhaust gas filtering system according to claim 5, wherein
the gas flow rate control means adjusts the exhaust gas quantity from the engine by varying the rotational speed of the engine according to a slip rate between an output shaft and a driving shaft of the engine, and a vehicle speed.

* * * * *